US008084101B2

(12) United States Patent
Das

(10) Patent No.: US 8,084,101 B2
(45) Date of Patent: Dec. 27, 2011

(54) FABRICATION OF PATTERNED AND ORDERED NANOPARTICLES

(75) Inventor: Biswajit Das, Henderson, NV (US)

(73) Assignee: The Board of Regents of the Nevada Systems of Higher Education on behalf of the University of Nevada, Las Vegas, Las Vegas, NV (US)

(*) Notice: Subject to any disclaimer, the term of this patent is extended or adjusted under 35 U.S.C. 154(b) by 798 days.

(21) Appl. No.: 11/888,476

(22) Filed: Aug. 1, 2007

(65) Prior Publication Data
US 2008/0292870 A1 Nov. 27, 2008

Related U.S. Application Data

(60) Provisional application No. 60/834,765, filed on Aug. 1, 2006.

(51) Int. Cl.
*B05D 1/40* (2006.01)
*B05D 3/14* (2006.01)

(52) U.S. Cl. ......... 427/474; 427/472; 427/547; 427/550

(58) Field of Classification Search .................. 427/472, 427/474, 547, 550
See application file for complete search history.

(56) References Cited

U.S. PATENT DOCUMENTS

| | | | |
|---|---|---|---|
| 6,843,850 B2 | 1/2005 | Avouris et al. | |
| 6,844,378 B1* | 1/2005 | Martin et al. | 523/300 |
| 2003/0170383 A1* | 9/2003 | Eastham | 427/180 |
| 2004/0005723 A1 | 1/2004 | Empedocles et al. | |
| 2004/0033679 A1 | 2/2004 | Jacobson et al. | |
| 2005/0123687 A1 | 6/2005 | Jacobs et al. | |
| 2006/0093749 A1* | 5/2006 | Kim et al. | 427/458 |
| 2006/0196375 A1 | 9/2006 | Coe-Sullivan et al. | 101/327 |
| 2007/0015350 A1 | 1/2007 | Crowley | 438/584 |

FOREIGN PATENT DOCUMENTS

WO WO2006/124320 11/2006

OTHER PUBLICATIONS

Xia, et al. "Lithographically Directed Deposition of Silica Nanoparticles Using Spin Coating," Journal of Vacuum Science and Technology B, vol. 22, Issue 6, Dec. 14, 2004, pp. 3415-3420.
Martinez, et al. "Patterning Polymeric Structures with 2 nm Resolution at 3 nm Half Pitch in Ambient Conditions" Nano Letters, vol. 7, No. 7, Mar. 13, 2007, pp. 1846-1850.
http://www.physics.uci.edu/~wilsonho/stm-iets.html.

* cited by examiner

*Primary Examiner* — Frederick Parker
(74) *Attorney, Agent, or Firm* — Mark A. Litman & Associates, PA.

(57) ABSTRACT

Methods, apparatus and systems form structures from nanoparticles by:
providing a source of nanoparticles, the particles being capable of being moved by application of a field, such as an electrical field, magnetic field and even electromagnetic radiation or fields such as light, UV, IR, radiowaves, radiation and the like;
depositing the nanoparticles to a surface in a first distribution of the nanoparticles;
applying a field to the nanoparticles on the surface that applies a force to the particles; and
rearranging the nanoparticles on the surface by the force from the field to form a second distribution of nanoparticles on the surface. The second distribution of nanoparticles is more ordered or more patterned than the first distribution of nanoparticles as a result of the rearranging.

17 Claims, 5 Drawing Sheets

FABRICATION OF PATTERNED AND ORDERED NANOPARTICLES

RELATED APPLICATION DATA

The present application claims priority from U.S. Provisional Application No. 60/834,765, filed Aug. 1, 2006.

BACKGROUND OF THE INVENTION

1. Field of the Invention

The present invention relates to the field of nanoparticles and nanotechnology, fabrication of nanotechnology, fabrication of patterned and ordered nanotechnology and devices, and fabrication of nanotubes from the ordered nanoparticles. The invention also relates to the field of fabrication of electronic, electrical and photonic devices using nanotechnology.

2. Background of the Art

Nanotechnology is an anticipated manufacturing technology giving thorough, inexpensive control of the structure of matter through the manipulation of individual atoms. The term has been used to refer to any attempt to work at the submicron scale, but this site mainly covers the subset usually called molecular nanotechnology. Broadly speaking, the central thesis of nanotechnology is that almost any chemically stable structure can be built by building from extremely small size (nanosize) building blocks.

Presently, manufacturers manipulate millions and billions of atoms at a time using conventional technologies. Atoms and molecules are shaped into products by pounding, chipping and other large scale mechanical deformation. For example, chips can be made by forming pure silicon substrates and then etching and depositing patterns of atoms and molecules on its surface. These techniques depend on large scale manipulation of atomic and molecular materials. Manipulating atoms today is still too high an order of complexity for existing mass production techniques. The quality of the control of the deposition of atomic materials requires the sacrifice of manufacturing speeds to assure deposition of atomic materials requires the sacrifice of manufacturing speeds to assure quality replication of intended designs. In the future, molecular nanotechnology will require more sophisticated yet high speed control over the placement of individual atoms.

Often, nanotechnology is referred to as "bottom-up" manufacturing. It aims to start with the smallest possible controllable building materials, atoms, and use them to create a desired product. Working with individual atoms and individual molecules allows an approximately atom-by-atom or molecule by molecule design of structures.

An ultimate objective of nanotechnology is to get essentially every atom in the right place, make almost any type of material structure that is consistent with the laws of physics and chemistry, and to have manufacturing costs that do not greatly exceed the cost of the required raw materials and energy.

Wilson Ho, Hyojune Lee, "Single bond formation and characterization with a scanning tunneling microscope," *Science* 286(26 Nov. 1999): 1719-1722; http://www.physics.uci.edu/~wilsonho/stm-iets.html describes the use of Atomic Force Microscopes for changing physical properties on surfaces.

To get every atom in the right place, it is necessary to develop techniques, processes, protocols and machines, often termed assemblers, that can force site-specific chemical reactions or atomic/molecular placement or materials. To find structures consistent with the laws of chemistry and physics, molecular modeling software will be used.

A self replicating assembler would work by using its ability to make site-specific chemical reactions to make copies of itself. These copies can then make copies of themselves also, and so on. Eventually, the assembler multitude can then work in parallel to build molecular structures. This has been referred to as genetic manufacturing since it assumes oriented duplication as occurs in biological operation of genetics. This massive parallelism would lead to great economies of scale, but it is still necessary to create the first self-replicating structure by an non-replication process and assembler. These assemblers can be compared to the molecular machinery evident in cells today.

Nanotechnology has not yet been developed on a commercial scale, but molecular models of possible nanomachines are becoming increasingly common. Often, these models analyze the basic tools necessary for a nanotechnological part or component that could go into tools such as an assembler.

SUMMARY OF THE INVENTION

Nanoparticles having a relatively uniform size distribution are provided onto a surface for permanent or temporary formation into a subsequent article or component of manufacture. The particles are usually electrically charged (e.g., triboelectrically, positive or negative, etc.) particles or magnetically susceptible particles, or any other field maneuverable particles which assists in their deposition upon the surface without permanent bonding of the particles to an initial position where the particles have been deposited on the surface. The particles are temporarily deposited on the surface in a fairly random or completely random pattern by any available particle generation and particle transport system. The particles are then subjected to a uniform or pulsed or otherwise ordered field to redistribute the particles on the surface, which is why the particles are not initially permanently fixed at a position on the surface. The redistribution of the particles is done in a manner that distributes the particles in a more ordered arrangement and even in specifically ordered and designed patterns on the surface. The particles are then retained on the surface (e.g., fixed, as by heating, coating, bonding or other means) or transferred (e.g., by a subsequent field driven transfer mechanism or even pressure or heat and pressure) to a permanent substrate or further intermediate transfer substrate. An Atomic Force Microscope (AFM) is one means on directing a field in a manner that can assist in particularly relocating the nanoparticles onto the initial temporary surface by applying an electrical field that redistributes the particles according to the effects of the applied field from the AFM. The field may be pulsed and the resolution of the application of the field and its effects corresponds closely with the field resolution of the AFM. The electric field from the tip of the AFM may move a large number of nanoparticles concurrently in the scan direction of the AFM, thus creating relatively large periodic arrays of uniformly spaced nanoparticles. By exercising planned and preferably computer driven control over the scan parameters (e.g., row and column dimensions, spacing between essentially pixel elements of deposition along the scan line, field intensity, etc.), the substrate can be intentionally patterned with the distribution of nanoparticle arrays.

Published US Patent Application 20070015350 (Crowley) describes nanotube formation by a method of controlling the manufacture of carbon nanotubes on a substrate, comprising: providing a substrate with a plurality of growth locations thereon; heating said substrate in a chamber; introducing a carbon bearing gas to said chamber to create carbon nanotubes on said growth locations on said substrate; applying an external controlling field to said chamber during said heating of said substrate; and controlling growth of said carbon nanotubes on said substrate.

Published US Patent Application 20060196375 describes a method for transferring a material to a substrate includes selectively depositing the material on a surface of an applicator and contacting the surface of the applicator to the substrate. The material can form a pattern on the surface of the applicator. The pattern can be preserved when the material is transferred to the substrate. The material can be deposited on the applicator by ink jet printing. The transfer of nanocrystal semiconductor particles is included in the disclosure.

DETAILED DESCRIPTION OF THE INVENTION

Figure 1:
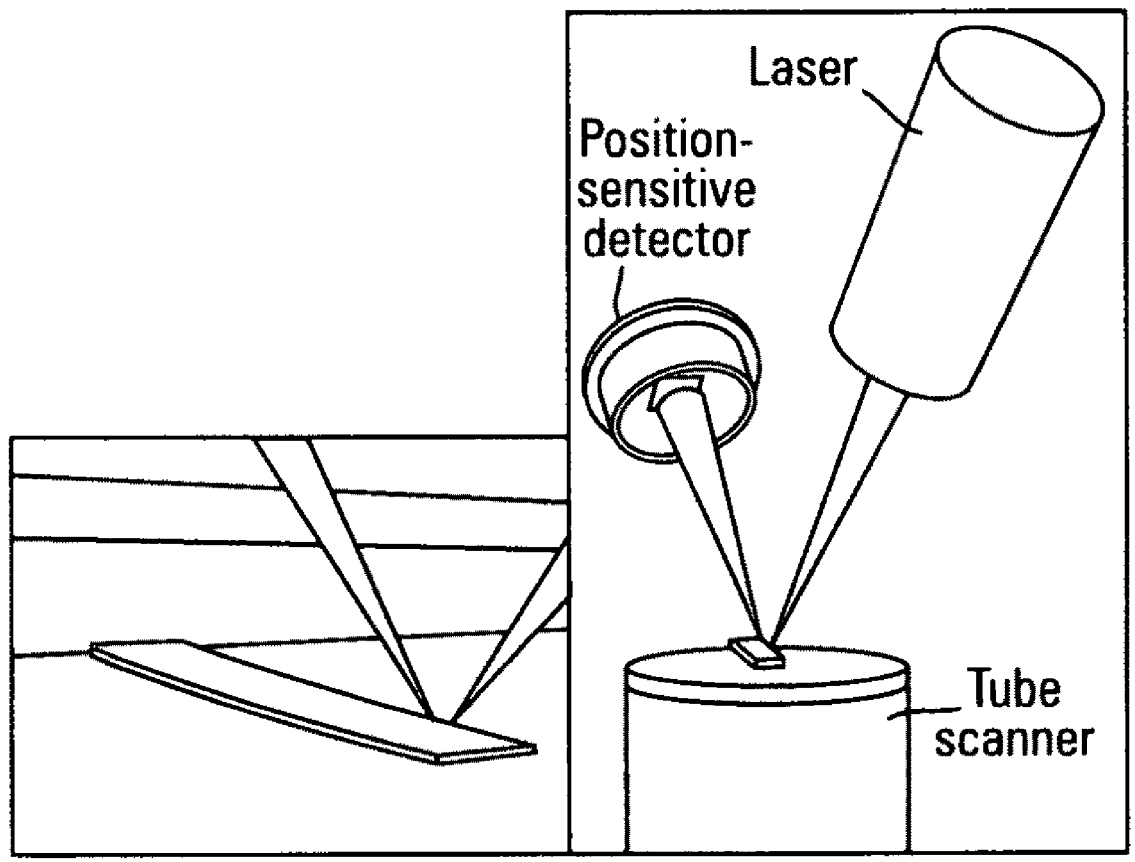
FIG. 1 shows a schematic of the concept of AFM and the optical lever: (left) a cantilever touching a sample; (right) the optical lever. Scale drawing; the tube scanner measures 24 mm in diameter, while the cantilever is 100 µm long.

A major challenge facing nanotechnology today is the fabrication of electronic and photonic devices in a commercially viable manner. One prerequisite for such commercial applications lies in the ability to enable mass fabrication as well as the ability to create 'ordering and patterning' of a large number of nanoparticles in a cost effective manner. The present technology relates to a novel tool, system and process to create large quantity of patterned and ordered nanoparticles with excellent size control. Nanoparticles with better than 5% size uniformity (e.g., less than ±5% standard deviation among number average particle distribution, such as measured by number average particle diameters) can be created using an ultra-high vacuum non-lithographic technique. A preferred method is based on atomic cluster formation from atoms or small clusters of atoms, such as those formed by vaporization or plasma techniques such as sputtered atoms. The particle or atom or molecule or cluster formation is then followed by mass filtering as needed (or not used if not needed), to provide the uniformity of nanoparticle sizes desired in the practice of the technology. The charged nanoparticles thus formed are then deposited onto a temporary or intermediate surface in a relatively random pattern. The deposition may be without any significant binding force between the intermediate surface and the particles, with such minor forces such as electrostatic charges, surface tension, gravity and the like providing sufficient associating forces The random pattern of deposited particles (which are not permanently fixed to the temporary surface are then ordered and patterned using controlled field scanning. For electrically charged deposited nanoparticles, the use of an atomic force microscope (AFM) tip is a way of providing a field (an electrical field in this instance) that can pattern or order the particles. The electric field from the tip moves a large number of nanoparticles concurrently in the scan direction thus creating very large periodic arrays of uniformly spaced nanoparticles. Controlling the scan parameters controls the nanoparticle array properties. The AFM tip scanning technique can be combined with application of additional voltages to the substrate to pattern the nanoparticle arrays. A major strength of this technique is its compatibility with the silicon CMOS technology thus making it suitable for volume manufacturing. Also, the high quality ordered and patterned nanoparticles can be created on any substrates including silicon, glass, composite and plastic. As an alternative to AFM scanning, large array field application (e.g., a 2-dimensional large area array of field generators) can be practiced or a line array can be scanned across a surface (e.g., a one dimensional line of field generators can be swept across the surface with random particles).

At least one underlying practice of the present technology relies upon a novel combination of apparatus used in a novel combination of steps, even though individual components of the apparatus and individual steps may separately known in other applications and uses. That underlying practice includes at least:

a) providing a source of relatively uniform nanoparticles (e.g., less than 20 nm particles with a standard deviation of less than ±25% by number average of particles);

b) providing those particles with a capability of being moved by application of a field, especially an electromagnetic field (e.g., an electrical field, magnetic field, electrostatic field or any other field to which the particles respond by a force created through the field), if the particles are not innately capable of being moved by a field (e.g., magnetically susceptible);

c) providing the field movable particles onto a substrate (usually with an initially random distribution although a pattern may be initially applied intentionally or incidentally); and d) rearranging the field movable particles on the substrate by applying a field to the particles on the surface to rearrange the particles on the surface.

The particles may be provided by any of the many variations of products and sources for nanoparticles, and may be filtered by mechanical, electrostatic means, or manufactured by any process that provides the particles in the size an distribution range desired for the process or selected for the specific ultimate use intended for the process or the resulting nanoparticle coated surface or final article. Any filtering technique that provides a useful size distribution of nanoparticles may also be used. The standard deviation indicated is designed for more precise applications and is not intended as a functional limitation on the general practice of the present technology. In some applications larger particles (generally requiring stronger field effects to move and locate the particles) may well be desirable, while in other cases, narrower size distributions and smaller size particles may be necessary. General range might be, for example, particles of from 2-15 nanometers (number average diameter), 3-18 nanometers (size average distribution), 2-20 nanometers (size or number average distribution), 2-10 nanometers, 2-5 nanometers, or 1-5 nanometers. The distribution may be considered along with percentage standard deviation limits or the standard percentage deviations may be considered separately, such as with standard deviations of the number average or size average particle sizes ±40%, ±30%, ±25%, ±20%, ±15%, ±12%, ±10%, ±8%, ±5%, or less.

The application of the force to rearrange particles usually is best applied without contact of the force applicator with the particles themselves or the side of the substrate carrying the particles (referred to herein as the "front side"). Thus, an electrical force can be applied from the front side by a non-contact Atomic Force Microscope or other precision stylus application system. Similarly a magnetic force can be applied by non-contact front side application of the field from a native magnetic stylus or pulsed electromagnetic stylus or tip. Typically, if the particles are charged (e.g., negative charge or positive charge), a like charge will be applied over the front side to assist in rearranging the particles. If an opposite charge were used from the front side, particles would tend to be lifted from the surface rather than be rearranged. If a stronger opposite field or charge is applied from the back side of the substrate or from within the substrate, an opposite charge (from that on the particles) may be applied from the front side without significant lifting of particles.

It is also possible to deposit nanotube growth catalyst particles onto a surface and distribute the catalyst particles in a similar manner to that disclosed herein for the deposition of the nanoparticles themselves, and then grow small nanotubes or nanoparticles on the surface of the deposited catalyst. Typical catalysts have been single metal, co-metal, or alloy metal particles such as derived from Co, Fe and Ni, although newer catalysts in clued those such as described in Published US Application 20070098622 which includes a carbide catalyst that contains at least elements (a transition metal element, In, C) or (a transition metal element, Sn, C), and in particular, it is preferable for the transition metal element to be Fe, Co or Ni. In addition to this carbide catalyst, a metal catalyst of (Fe, Al, Sn) and (Fe, Cr, Sn) are effective. From among these, catalysts such as $Fe_3In_{0.5}$, $Fe_3InC_{0.5}Sn$, and $Fe_3Sn_C$ are particularly preferable.

The force application may also be applied to the back side of the substrate with a controlled strength similar charge or opposite charge, and the force applicator may now contact the rear side of the support surface without concern for physical rearrangement of the nanoparticles by the force applicator. If a charge opposite that of the charge on the particles is used, no additional biasing charge would be required (although it might be used for better control and precision of field and particle distribution). If a same charge or field (magnetic field, North-South orientation of field) is used for the back side field application as the charge (or field) on the nanoparticles, a biasing force facing the front side of the support surface may be used to prevent particles from being repelled from the support surface. For example, the biasing front side field may be at least about 5% or 10% (or greater) stronger than the rear side field applied to the field susceptible particles. Stronger in this sense does not necessarily mean absolute strength at the point of emission or generation of the field, but rather the strength as it affects the movement of particles. For example, in relative non-unit terms, the biasing field may be 100 absolute units where generated and the backside field strength may be 120 absolute units. However, because of the proximity and medium through which the front side field is applied (e.g., a high vacuum, medium vacuum, low vacuum or other pressure, and the particular gaseous medium used (e.g., an inert gas, noble gas, non-reactive gas, etc.), the actual effective front side field strength may be 80 units, while the insulating or field shielding effect of the back side application may reduce the effective back side field strength from 120 units to 60 units, thus maintaining the particles on the support surface while the particles are being rearranged by the field(s) applied.

Where the particles are potentially reactive with various gases (e.g., oxygen, halogens, hydrogen, and the like) or other materials that may be in the particle application or particle rearranging environment, the particles should be protected against reaction, unless a reaction is desired (e.g., depositing aluminum nanoparticles in an oxidizing environment so that oxidized aluminum (e.g., alumina) nanoparticles are formed before, during or after deposition. The best method of protecting the particles is under vacuum conditions such as at about $10^{-10}$ Torr, or at least between about $10^{-5}$ Torr and $10^{-11}$ Torr.

A presently preferred range of particle sizes (e.g., non-agglomerated particles average size or agglomerated particles average size) is between 1 and 20 nanometers, 1-15 nanometers, 2-20 nanometers, 2-15 nanometers, 2-10 nanometers, 5-15 nanometers and 5-10 nanometers, depending upon the particles process used, the particular article intended and the strength of the field(s) used.

The process of rearranging the particles is generally referred to as patterning of the particles, as the original deposition of particles tends to be random, if not completely random. Of note, when the particles are deposited on the surface, even though it is a relatively smooth surface (as with commercial grade silicon wafers), there is some topography on the support surface, such as rills, mounds, waves, modulations, random topographic events and the like. Particles when deposited on the surface may naturally seek to orient themselves along such topographic anomalies, and this is not considered a pattern or intended arrangement. Even with this incidental alignment of particles with the topography, after application of the field (by smooth field application, field array application, pulsed application, or the like), the particles tend to orient themselves in the applied field pattern and overcome the incidental tendency to align with topographic features. This can readily be seen with microscopic or photomicroscopic views (e.g., scanning electron microscope images) of the randomly deposited particles and the patterned particles after application of the field.

Creation of ordered and patterned nanoparticles with high purity and good size control is a prerequisite for many device applications. The present technology opens the door for many commercial applications in biomedical, optical and electronic devices. Light emitting devices, sensors, single electron transistors and biomolecular tagging are only a small sample of potential applications.

In the performance of the process of manufacturing final products, intermediate structures and articles are formed that are novel. For example, one article of intermediate manufacture has a first substrate having a first front surface with at least a first area comprising a distribution of nanoparticles on its surface. The distribution of nanoparticles is imposed, controlled, initiated, maintained or the like by a field applied to the surface and particles. A distribution of the particles is provided by the forces of the field having a standard deviation of distances between particles of less than ±20%, less than ±15%, less than ±10% or even less than ±5% from an average distance between nanoparticles on the surface. These deviations may be considered in addition to particle size variations on the distributions or separately from the effects of particle size distributions on the spacing on the surface. A second substrate having a receiving surface can be maintained in a proximity to the distribution of nanoparticles such that the distribution of nanoparticles can be transferred from the first surface to the second substrate by at least one of pressure, heat and pressure or variation in field intensity and/or field direction. As noted elsewhere herein in the description of the process, the field applied to the substrate preferably emanates from a second surface that is on a back side of the first substrate. The area within which there is this relatively uniform distribution of particles preferably is a first area comprising at least 0.5-1 mm$^2$. The first area of at least 1 mm$^2$ initially may comprise a part of a continuous area having the nanoparticles distributed over a first area of at least 1 cm$^2$. The first area of at least 1 mm$^2$ comprises a part of a discontinuous area on the first surface. The discontinuous area may have the nanoparticles distributed over the first area as at least 1 cm$^2$ with intermediate areas (between first areas of at least 0.5-1 mm$^2$) wherein the distribution of particles within the intermediate area have a standard deviation of distances between particles of greater than ±30%, greater than ±40%, or greater than ±50%, from the average distance between nanoparticles on the surface within the first area.

The atomic force microscope (AFM) is a very high-resolution type of scanning probe microscope that may used as a field applicator in certain practices of the present technology. The AFM was invented by Binnig, Quate and Gerber in 1985, and is one of the foremost tools for the manipulation of matter at the nanoscale.

The AFM consists of a cantilever (probe) with a sharp tip at its end that is used to scan the specimen surface. The probe is typically silicon or silicon nitride with a tip radius of curvature on the order of nanometers. When the tip is brought into close proximity of a sample surface, the Van der Waals force between the tip and the sample leads to a deflection of the cantilever according to Hooke's law. Typically, the deflection is measured using a laser spot reflected from the top of the cantilever into an array of photodiodes. However a laser detection system can be expensive and bulky; an alternative method in determining cantilever deflection is by using piezoresistive AFM probes. These probes are fabricated with piezoresistive elements that act as a strain gage. Using a Wheatstone bridge, strain in the AFM probe due to deflection can be measured, but this method is not as sensitive as laser deflection.

If the tip were scanned at a constant height, there would be a risk that the tip would collide with the surface, causing damage. Hence, in most cases a feedback mechanism is employed to adjust the tip-to-sample distance to maintain a constant force between the tip and the sample. Generally, the sample is mounted on a piezoelectric tube, that can move the sample in the z direction for maintaining a constant force, and the x and y directions for scanning the sample. The resulting map of s(x,y) represents the topography of the sample. However, with substrate surfaces that are 'flat' with respect to the possible variations in the up-and-down movement of the AFM tip, minimal to no feedback may be necessary.

Over the years additional modes of operation have been developed for the AFM. The primary modes of operation are contact mode, non-contact mode, and dynamic contact mode. In the contact mode operation, the force between the tip and the surface is kept constant during scanning by maintaining a constant deflection. In the non-contact mode, the cantilever is externally oscillated at or close to its resonance frequency. The oscillation is modified by the tip-sample interaction forces; these changes in oscillation with respect to the external reference oscillation provide information about the sample's characteristics. Because most samples develop a liquid meniscus layer, keeping the probe tip close enough to the sample for these inter-atomic forces to become detectable while preventing the tip from sticking to the surface presents a major hurdle for non-contact mode in ambient conditions. Dynamic contact mode was developed to bypass this problem (Zhong et al). In dynamic contact mode, the cantilever is oscillated such that it comes in contact with the sample with each cycle, and then enough force is applied to detach the tip from the sample.

Schemes for non-contact and dynamic contact mode operation include frequency modulation and the more common amplitude modulation. In frequency modulation, changes in the oscillation frequency provide information about a sample's characteristics. In amplitude modulation (better known as intermittent contact, semi-contact, or tapping mode), changes in the oscillation amplitude yield topographic information about the sample. Additionally, changes in the phase of oscillation under tapping mode can be used to discriminate between different types of materials on the surface.

The AFM has several advantages over the scanning electron microscope (SEM). The AFM can produce images of materials as small as 1 nm, while the SEM is limited to around 100 nm. Unlike the electron microscope which provides a two-dimensional projection or a two-dimensional image of a sample, the AFM provides a true three-dimensional surface profile. Additionally, samples viewed by AFM do not require any special treatments (such as metal coatings) that would irreversibly change or damage the sample. While an electron microscope needs an expensive vacuum environment for proper operation, most AFM modes can work perfectly well in ambient air or even a liquid environment.

The AFM tends to image a maximum height on the order of micrometers and a maximum scanning area of around 150 by 150 micrometers. At high resolution, the quality of an image is limited by the radius of curvature of the probe tip, and so the selection of appropriate dimensions on the tip for the required resolution is an important selection or design parameter in the operation of specific assembly processes, even though any commercial tip can be used for manufacture where less resolution or perfection of deposition is needed.

The atomic force microscope is one of about two dozen types of scanned-proximity probe microscopes. All of these microscopes work by measuring a local property—such as height, optical absorption, or magnetism—with a probe or "tip" placed very close to the sample. The small probe-sample separation (on the order of the instrument's resolution) makes it possible to take measurements over a small area. To acquire an image the microscope raster-scans the probe over the sample while measuring the local property in question. The resulting image resembles an image on a television screen in that both consist of many rows or lines of information placed one above the other. Unlike traditional microscopes, scanned-probe systems do not use lenses, so the size of the probe, rather than diffraction effects, generally limit their resolution.

AFM (FIG. 1) operates by measuring attractive or repulsive forces between a tip and the sample. In its repulsive "contact" mode, the instrument lightly touches a tip at the end of a leaf spring or "cantilever" to the sample. As a raster-scan drags the tip over the sample, some sort of detection apparatus measures the vertical deflection of the cantilever, which indicates the local sample height. Thus, in contact mode the AFM measures hard-sphere repulsion forces between the tip and sample.

In noncontact mode, the AFM derives topographic images from measurements of attractive forces; the tip does not touch the sample.

AFMs can achieve a resolution of 10 pm, and unlike electron microscopes, can image samples in air and under liquids. In principle, AFM resembles the record player as well as the stylus profilometer. However, AFM incorporates a number of refinements that enable it to achieve atomic-scale resolution:

Sensitive detection
Flexible cantilevers
Sharp tips
High-resolution tip-sample positioning
Force feedback AFMs can generally measure the vertical deflection of the cantilever with picometer resolution. To achieve this, most AFMs use the optical lever, a device that achieves resolution comparable to an interferometer while remaining inexpensive and easy to use.

The optical lever (FIG. 1) operates by reflecting a laser beam off the cantilever. Angular deflection of the cantilever causes a twofold larger angular deflection of the laser beam. The reflected laser beam strikes a position-sensitive photodetector consisting of two side-by-side photodiodes. The difference between the two photodiode signals indicates the position of the laser spot on the detector and thus the angular deflection of the cantilever.

Because the cantilever-to-detector distance generally measures thousands of times the length of the cantilever, the optical lever greatly magnifies motions of the tip. Because of this ~2000-fold magnification optical lever detection can theoretically obtain a noise level of about $10^{-14}$ m/Hz$^{1/2}$. For measuring cantilever deflection, to date, only the relatively cumbersome techniques of interferometry and tunneling detection have approached this value.

Figure 2:
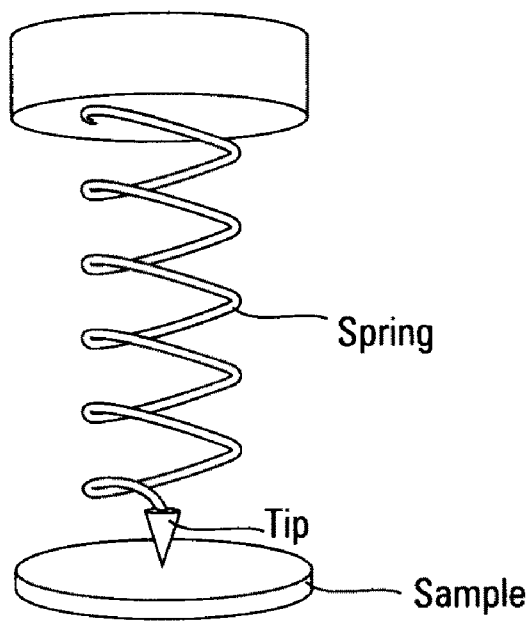
FIG. 2 shows a schematic illustration of the meaning of "spring constant" as applied to cantilevers. Visualizing the cantilever as a coil spring, its spring constant k directly affects the downward force exerted on the sample.

A high flexibility stylus exerts lower downward forces on the sample, resulting in less distortion and damage while scanning. For this reason AFM cantilevers generally have spring constants of about 0.1 N/m (FIG. 2).

It would take a very long time to image a surface by dragging the coiled cantilever system over the surface (in the configuration of FIG. 2), because the coiled system cannot respond quickly as it passes over features. That is, it has a low resonant frequency, but an AFM cantilever should have a high resonant frequency.

The equation for the resonant frequency of a spring:

$$\text{resonant frequency} = \frac{1}{2\pi} \sqrt{\frac{\text{spring constant}}{\text{mass}}}$$

shows that a cantilever can have both low spring constant and high resonant frequency if it has a small mass. Therefore AFM cantilevers tend to be very small. Commercial vendors manufacture almost all AFM cantilevers by microlithography processes similar to those used to make computer chips. Cantilevers may measure at least 50-100 µm in length and can be found in the art as consisting of silicon oxynitride with a thin coating of gold for reflectivity. Most users purchase AFM cantilevers with their attached tips from commercial vendors, who manufacture the tips with a variety of microlithographic techniques.

A close enough inspection of any AFM tip reveals that it is rounded off. Therefore force microscopists generally evaluate tips by determining their "end radius." In combination with tip-sample interaction effects, this end radius generally limits the resolution of AFM. As such, the development of sharper tips is currently a major concern. Force microscopists generally use one of three types of tip. The "normal tip" is a 3 µm tall pyramid with ~30 nm end radius. An electron-beam-deposited (EBD) tip improves on this with an electron-beam-induced deposit of carbonaceous material made by pointing a normal tip straight into the electron beam of a scanning electron microscope. Especially if the user first contaminates the cantilever with paraffin oil, a EBD tip will form upon stopping the raster of the electron beam at the apex of the tip for several minutes. The EBD tip offers a higher aspect ratio (it is long and thin, good for probing pits and crevices) and sometimes a better end radius than the normal tip. Finally, Park Scientific Instruments offers the "Ultralevemm" tip, based on an improved microlithography process. Ultralevers™ tip offers a moderately high aspect ratio and on occasion a ~10 nm end radius.

Figure 3:
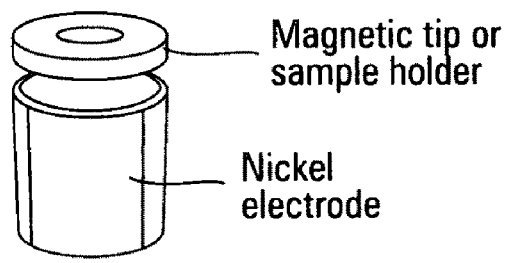
FIG. 3 shows an exploded view of a tube scanner. Applying a voltage to one of the four outer quadrants causes that quadrant to expand and the scanner to tilt away from it (XY movement). A corresponding negative voltage applied to the opposite quadrant doubles the XY range while preventing vertical motion. Applying a voltage to the inner electrode causes the entire tube to expand or contract (Z movement).

Piezoelectric ceramics are a class of materials that expand or contract when in the presence of a voltage gradient or, conversely, create a voltage gradient when forced to expand or contract. Piezoceramics make it possible to create three-dimensional positioning devices of arbitrarily high precision. Most scanned-probe microscopes use tube-shaped piezoceramics because they combine a simple one-piece construction with high stability and large scan range. Four electrodes cover the outer surface of the tube, while a single electrode covers the inner surface. Application of voltages to one or more of the electrodes causes the tube to bend or stretch, moving the sample in three dimensions (FIG. 3). FIG. 3 shows an exploded view of a tube scanner. Applying a voltage to one of the four outer quadrants causes that quadrant to expand and the scanner to tilt away from it (XY movement). A corresponding negative voltage applied to the opposite quadrant doubles the XY range while preventing vertical motion. Applying a voltage to the inner electrode causes the entire tube to expand or contract (Z movement).

AFMs use feedback to regulate the force on the sample as illustrated in FIG. 3. The presence of a feedback loop is one of the subtler differences between AFMs and older stylus-based instruments such as record players and stylus profilometers. The AFM not only measures the force on the sample but also regulates it, allowing acquisition of images at very low forces.

The feedback loop (FIG. 3) consists of the tube scanner that controls the height of the entire sample; the cantilever and optical lever, which measures the local height of the sample; and a feedback circuit that attempts to keep the cantilever deflection constant by adjusting the voltage applied to the scanner.

Figure 4:
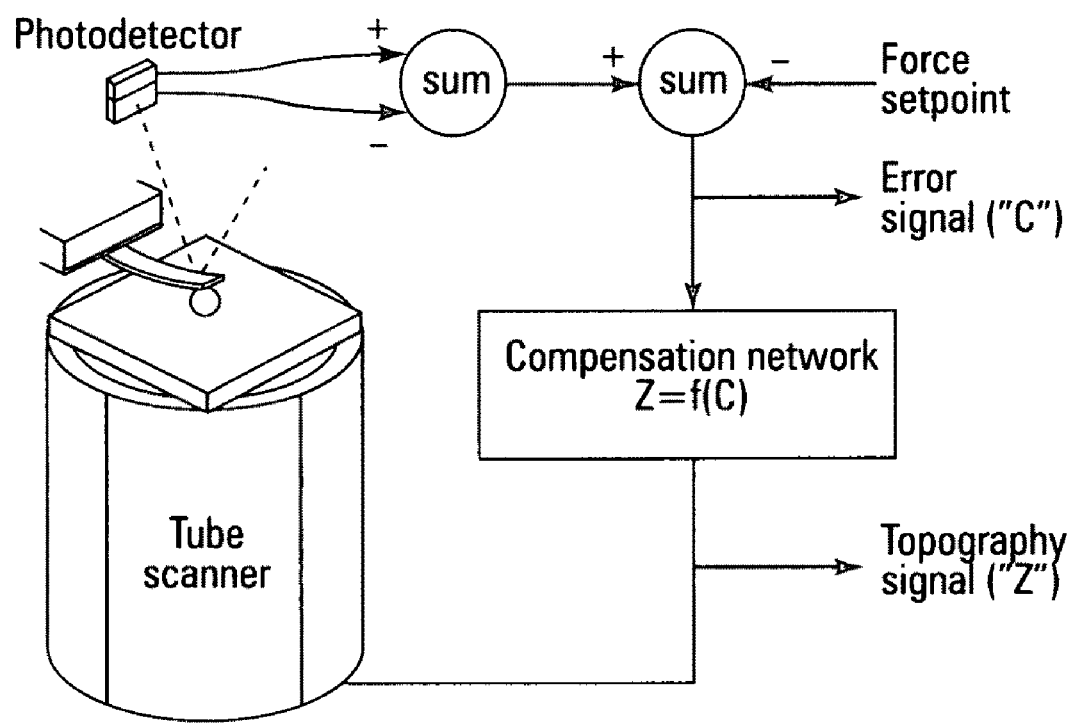
FIG. 4 shows an AFM feedback loop. A compensation network (which in my AFM is a computer program) monitors the cantilever deflection and keeps it constant by adjusting the height of the sample (or cantilever).

One point of interest: the faster the feedback loop can correct deviations of the cantilever deflection, the faster the AFM can acquire images; therefore, a well-constructed feedback loop is essential to microscope performance. AFM feedback loops tend to have a bandwidth of about 10 kHz, resulting in image acquisition times of about one minute. Almost all AFMs can measure sample topography in two ways: by recording the feedback output ("Z") or the cantilever deflection ("error"; see FIG. 4). The sum of these two signals always yields the actual topography, but given a well-adjusted feedback loop, the error signal should be negligible. As described below, AFMs may have alternative imaging modes in addition to these standard modes.

Optical lever AFMs can measure the friction between tip and sample. If the scanner moves the sample perpendicular to the long axis of the cantilever (FIG. 4), friction between the tip and sample causes the cantilever to twist. A photodetector position-sensitive in two dimensions can distinguish the resulting left-and-right motion of the reflected laser beam from the up-and-down motion caused by topographic variations.

Therefore, AFMs can measure tip-sample friction while imaging sample topography. Besides serving as an indicator of sample properties, friction (or "lateral force," or "lateral deflection") measurements provide valuable information about the tip-sample interaction.

Each bump on a scanned surface may represent one carbon atom. As the tip moves from right to left, it bumps into an atom and gets stuck behind it. The scanner continues to move and lateral force builds up until the tip slips past the atom and sticks behind the next one. AFM can also image the softness of a sample by pressing the cantilever into it at each point in a scan. The scanner raises the sample or lowers the cantilever by a preset amount, the "modulation amplitude" (usually 1-10 nm). In response, the cantilever deflects an amount dependent on the softness of the sample: the harder the sample, the more the cantilever deflects.

The meniscus force is an important influence on the tip-sample interaction force when imaging in air. When imaging in air, a layer of water condensation and other contamination covers both the tip and sample, forming a meniscus that pulls the two together. "Force curves" showing cantilever deflection as the scanner lowers the sample reveal the attractive meniscus force: the cantilever has to exert an upward force to pull the tip free of the meniscus. This force equals the attractive force of the meniscus, usually 10-100 nN.

The great strength of the meniscus makes it the most important influence on the tip-sample interaction. Force microscopists often eliminate the meniscus by completely immersing both tip and sample in water.

Figure 5:
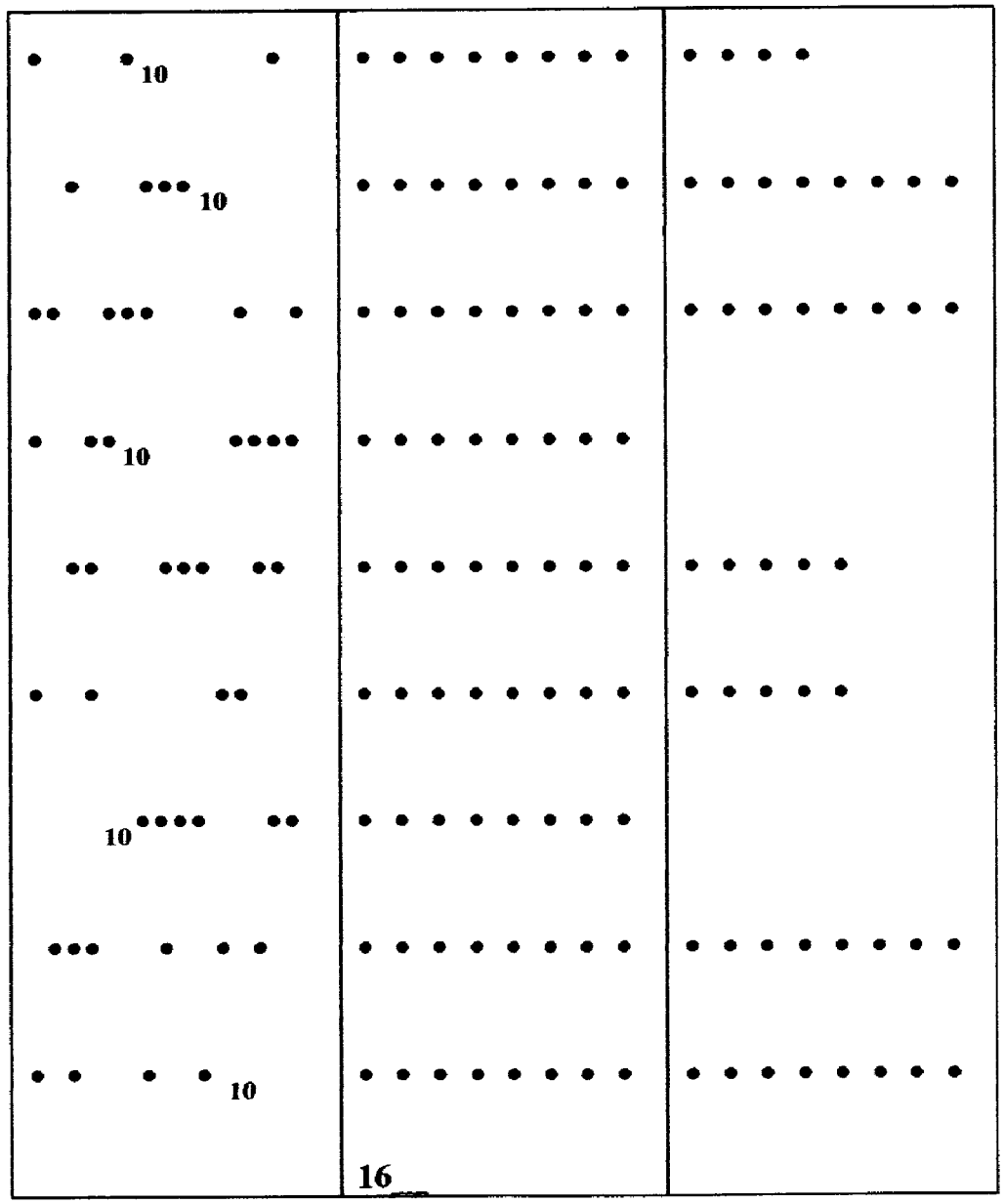
FIG. 5 shows a perspective view of a substrate having areas of random particles, ordered particles and design-distributed particles resulting from the application or non-application of a field from a non-contact Atomic Force Microscope facing the side of the substrate carrying the nanoparticles.

FIG. 5 shows a substrate 2 with three different zones 4, 6 and 8 illustrated thereon. Each zone has nanoparticles 10 in different states of orientation. Zone 4 shows a representation of nanoparticles 10 in which the nanoparticles 10 have been randomly deposited. Zone 6 shows an area where the nanoparticles 10 have been repeatedly scanned by a field (e.g., an AFM) along scan direction 16 to provide an ordered array of nanoparticles 10. Zone 8 is a representation of an area where a particular and directed distribution of the field has been applied to position nanoparticles 10 in oriented positions to define specific distribution of nanoparticles 10. A field applicator 12 is shown, with a tip 14 that precisely directs the field close to the substrate 2.

Figure 6:
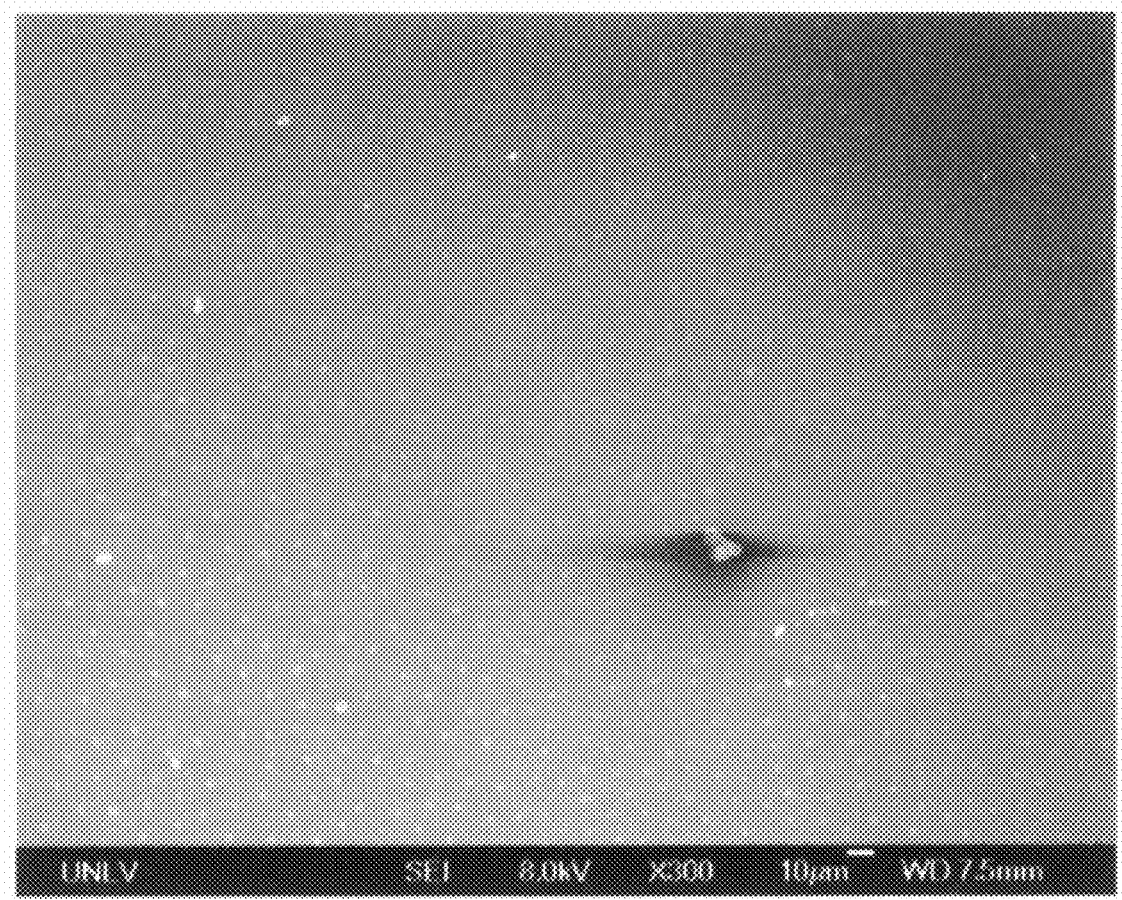
FIG. 6 shows a photomicrograph of an ordered nanoparticle array formed by technology according to the present disclosure, including a single major coating defect.

FIG. 6 shows a photomicrograph of an ordered nanoparticle array formed by technology according to the present disclosure, including a single major coating defect caused by a single particle that is too large for use. This particle could have been initially removed from the applied particles by better filtering or manufacture controls.

The general technology described herein enables and describes both methods, apparatus and systems of forming structures from nanoparticles. A general method according to the present technology may comprise:

providing a source of nanoparticles (e.g., metal, metalloid, atomic, molecular, charged, magnetic, inorganic, organic, etc.), the particles being capable of being moved by application of a field, such as an electrical field, magnetic field and even electromagnetic radiation or fields such as light, UV, IR, radiowaves, radiation and the like;

depositing the nanoparticles to a surface in a first distribution of the nanoparticles;

applying a field to the nanoparticles on the surface that applies a force to the particles;

rearranging the nanoparticles on the surface by the force from the field to form a second distribution of nanoparticles on the surface. The second distribution of nanoparticles is more ordered or more patterned than the first distribution of nanoparticles as a result of the rearranging. The ordering phenomenon is not fully understood, but one explanation or hypothesis for the electrical field forces is that (for example with negatively charged particles applied to the nanoparticles deposited on the surface) the first application of particles is fairly randomly deposited because the charges on the individual particles do not significantly interact with each other and the particles tend to remain sufficiently far apart where the charge forces on the individual particles do not greatly interact, even when small clusters of particles associate on the surface, possibly because of responsive (positive) charge distributions crated on the surface. The application of locally strong or wide area strong field forces then strongly affects the relative position of the particles, possibly by destabilizing the same charged (negatively charged particles in a negative field) nanoparticles, allowing them to less strongly adhere to the surface, causing them to float more freely (as with a small wave lifting small articles from a sand beach), and allowing the interparticles charge effects to more easily order or rearrange the respective particles. The application of forces by an AFM cause those forces to be intense for short durations on a local scale, so that particle rearrangement patterns corresponding to the scan pattern on the surface can be viewed as result of the AFM scan. The field, as indicated above, may be an electromagnetic field, or may be an electrical field or a magnetic field. At present, a preferred field is an electrical field and electrically charged nanoparticles are deposited onto the surface. It is desirable that the surface is a flat surface. Flat is always a relative term, but in the practice of the present technology considerations of this term should be made with respect to a flat surface having less than 5%, less than 3%, less than 2% and preferably less than 1% of the total surface on which particles are deposited with vertical features greater than a number average diameter for the nanoparticles being deposited. For example, if 10 nm nanoparticles are deposited, less than 5% of the total surface area should have peaks or valleys that extend 10 nm or more above or below and average surface plane. As the particles get smaller, the topography variations should get smaller, although with 2 nm particles deposited, less than 5% of surface area with less than 5 nm features is satisfactory. The method, apparatus and system should maintain a vacuum of less than $10^{-5}$ Torr (e.g., $10^{-6}$ Torr is less than $10^{-5}$ Torr, even though it is a stronger vacuum) over the surface while nanoparticles are being deposited. In another alternative, the nanoparticles are magnetically susceptible and the field is a magnetic field. In a system and process control for the rearrangement, the field may be applied to the deposited nanoparticles from a front side of the surface on which the particles are deposited without a field applicator contacting the front side of the surface. Alternatively, field is applied to the deposited nanoparticles from a back side of the surface on which the particles are deposited with a field applicator either contacting or not contacting the back side of the surface. In addition to the field rearranging the particles, a biasing field opposed to the field rearranging the nanoparticles may be applied to provide control over influence of the field rearranging the nanoparticles, either with a same field orientation or an opposite field orientation as described above.

A system or apparatus for forming structures from nanoparticles may comprise:

a source of nanoparticles;

a surface for receiving a deposit of nanoparticles;

a system for maintaining a vacuum over the surface while nanoparticles are being deposited in a first distribution of the nanoparticles;

a field applicator that applies a field to the first distribution of nanoparticles on the surface, the field applicator applying a force to the particles within the vacuum system.

Computer or processor technology may preferably be integrated into the process, system and apparatus to provide greater automation to the system. The process may be operated in a batch mode or continuous mode, with the substrate moving continuously through the particle source zone, particle application zone, and particle rearrangement zone under a continuous vacuum. The AFM feedback loop may be a compensation network (which in my AFM is a computer program) monitors the cantilever deflection and keeps it constant by adjusting the height of the sample (or cantilever).

EXAMPLES

Prophetic Example I

An ultra-smooth (e.g., having less than 5.0 wavelengths of smoothness) silicon substrate (e.g., commercially available silicon wafer) having a thickness of 0.5 mm may be used as the permanent or intermediate substrate. A source of relatively uniform nanoparticles (e.g., number average) Nickel particles of less than 10 nm diameter with a standard deviation of less than ±25% would be provided. These particles would be negatively electrostatically charged by conventional particle charging methods (e.g., corona charging) such as tribolelectric charging. Or the particles could be charged by the fabrication process itself, such as sputtering from a target. The charged particles would be physically deposited in a random distribution in a low vacuum environment (e.g., less than $1 \times 1^{-5}$ Torr) onto the silicon wafer smooth surface. The charge of the particle would assist in positioning the particles and adhering the particles to the wafer surface in a random distribution, with some particles even in contact with other particle(s). An atomic force microscope with a negatively charged tip would scan across the randomly distributed particle covered surface (above the surface without contact with particles or the surface) of the silicon wafer at scan intervals of about 20 nm with a charge field intensity sufficient to redistribute particles, but not so intense as to drive particles off the surface. The scanning with this field would produce an evenly spaced distribution of particles in a nearly regular matrix form, with rows at about 20 nm.

The density of the particles initially deposited onto the surface will assist in determining parameters of concentration of particles distributed by the applied electrostatic field. For example, if the particle density originally deposited doubles, the spacing between particles may decrease by about a division of the inverse of the square root of 2 (as there is a two dimensional compression of distance between columns and rows of particles). The distribution works best when the particle density deposited is sufficiently high so that the spacing between scan lines for the application of the field (as measured by the space between intersecting Gaussian distribution curves of the applied field on the surface at 80% maximum intensity being spaced apart by no more than 50× the average particle diameter size and preferably no more than 20× the number average diameter particle size.

Prophetic Example II

An ultra-smooth (e.g., having less than 5.0 wavelengths of smoothness) silicon substrate (e.g., commercially available silicon wafer) having a thickness of 0.5 mm may be used as the permanent or intermediate substrate. A source of relatively uniform nanoparticles (e.g., number average) Iron particles of less than 8 nm diameter with a standard deviation of less than ±15% would be provided. These particles would be negatively electrostatically charged by conventional particle charging methods such as tribolelectric charging merely to assist them iron particles in loosely attaching to the silicon wafer surface, even though the electrical charge would not be important to subsequent steps. The charged particles would be physically deposited in a random distribution in a standard atmosphere environment onto the silicon wafer smooth surface. The charge of the particle would assist in positioning the particles and adhering the particles to the wafer surface in a random distribution, with some particles even in contact with other particle(s). A magnetic field is directionally applied as a local array against the back of the wafer. The wafer is vibrated to physically separate the iron particles. The magnetic field lines are directed in an array pattern through the silicon wafer so that particles vertically align N-S, adjacent the wafer-above the wafer. The N-S alignment separates particles because of the N-N repulsion and S-S repulsion between adjacent iron particles. The magnetic field applied to the silicon wafer has approximate separations or intervals of about 15 nm with a magnetic field intensity (e.g., 0.01 Tesla) sufficient to redistribute particles.

Other options, variations, alternatives and controls over the system will be apparent to those skilled in the art upon reading this technical disclosure. All references cited herein are incorporated by reference in their entirety.

What is claimed:

1. A method of forming structures from nanoparticles comprising:
    providing a source of nanoparticles;
    depositing the nanoparticles onto a surface in a first distribution of the nanoparticles;
    applying a field pattern to the nanoparticles on the surface that applies a force to the particles; and
    rearranging the nanoparticles on the surface by the force from the field to form a second distribution of nanoparticles on the surface that is more ordered or more patterned than the first distribution of nanoparticles, the force from the field tending to orient the nanoparticles in the applied field pattern and overcoming incidental tendencies of the nanoparticles to align with topographic features on the surface.

2. The method of claim 1 wherein the field is an electrical field.

3. The method of claim 1 wherein the field is an electrical field or a magnetic field.

4. The method of claim 1 wherein the field is an electrical field and electrically charged nanoparticles are deposited onto the surface.

5. The method of claim 1 wherein the surface is a flat surface having less than 1% of the flat surface with vertical features greater than a number average diameter for the nanoparticles being deposited.

6. The method of claim 1 wherein a vacuum of less than $10^{-5}$ Torr is maintained over the surface while nanoparticles are being deposited.

7. The method of claim 4 wherein a vacuum of less than $10^{-5}$ Torr is maintained over the surface while nanoparticles are being deposited.

8. The method of claim 4 wherein the field is applied to the deposited nanoparticles from a front side of the surface on which the particles are deposited without a field applicator contacting the front side of the surface.

9. The method of claim 4 wherein the field is applied to the deposited nanoparticles from a back side of the surface on which the particles are deposited with a field applicator either contacting or not contacting the back side of the surface.

10. The method of claim 4 wherein in addition to the field rearranging the particles, a biasing field opposed to the field rearranging the nanoparticles is applied to provide control over influence of the field rearranging the nanoparticles.

11. The method of claim 4 wherein the standard deviation of distances between particles in the second distribution of particles is less than +15% from an average distance between nanoparticles on the surface while the standard deviation of distances between particles in the first distribution was greater than +20% from an average distance between nanoparticles on the surface.

12. The method of claim 11 wherein the standard deviation of distances between particles in the second distribution of particles is less than ±10% from an average distance between nanoparticles on the surface while the standard deviation of distances between particles in the first distribution was greater than ±20% from an average distance between nanoparticles on the surface.

13. The method of claim 4 wherein the field applied to the substrate emanates from a second surface that is on a back side of the substrate.

14. The method of claim 4 wherein the method is performed on a surface having a first area of at least 1 mm$^2$ and the first area comprises a part of a continuous area having the nanoparticles distributed over the first of at least 1 cm$^2$.

15. The method of claim 4 wherein the surface is free of catalyst for nanotube growth between particles and the substrate.

16. A method of forming structures from nanoparticles according to claim 1 comprising:
    providing a source of nanoparticles;
    depositing the nanoparticles to a surface in a first distribution of the nanoparticles;
    applying a field to the nanoparticles on the surface that applies a patterned field of force to the particles, the field being selected from the group consisting of an electrical field, a magnetic field, and an electromagnetic field; and
    rearranging the nanoparticles in the pattern of the field on the surface by the force from the field to form a second distribution of nanoparticles on the surface that is more ordered or more patterned than the first distribution of nanoparticles.

17. A method of forming structures from nanoparticles comprising:
    providing a source of nanoparticles;
    depositing the nanoparticles to a surface in a first distribution of the nanoparticles;
    applying a field to the nanoparticles on the surface that applies a force to the particles;
rearranging the nanoparticles on the surface by the force from the field to form a second distribution of nanoparticles on the surface that is more ordered or more patterned than the first distribution of nanoparticles wherein the field is an electrical field and electrically charged nanoparticles are deposited onto the surface wherein the standard deviation of distances between particles in the second distribution of particles is less than +15% from an average distance between nanoparticles on the surface while the standard deviation of distances between particles in the first distribution was greater than +20% from an average distance between nanoparticles on the surface wherein a second substrate having a receiving surface is maintained in a proximity to the second distribution of nanoparticles and the second distribution of nanoparticles is transferred from the first surface to the second substrate by at least one of pressure, heat and pressure or variation in field intensity and/or field direction.

* * * * *